Feb. 13, 1951     D. L. SISSLER     2,541,301
ROLLER LUBRICATOR FOR THE SURFACE OF CONVEYER BELTS
Filed July 22, 1948
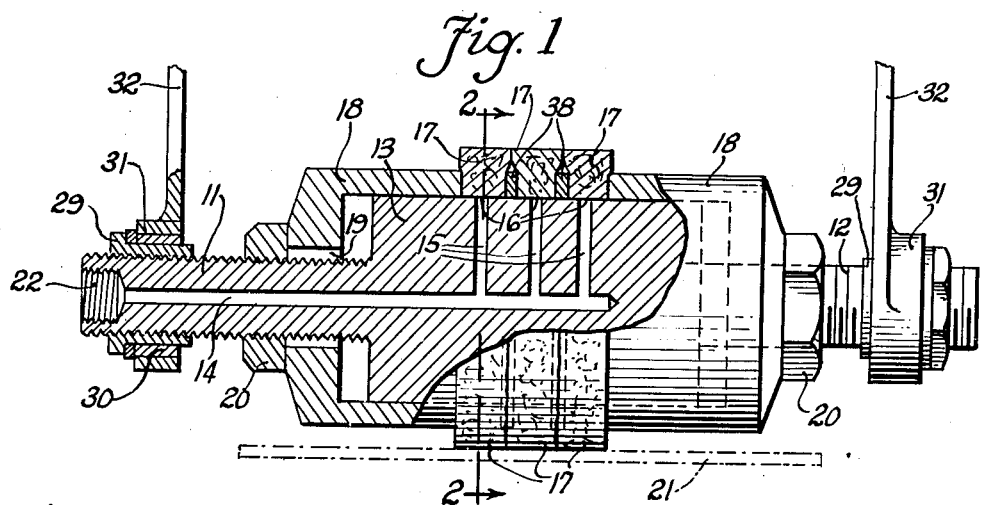
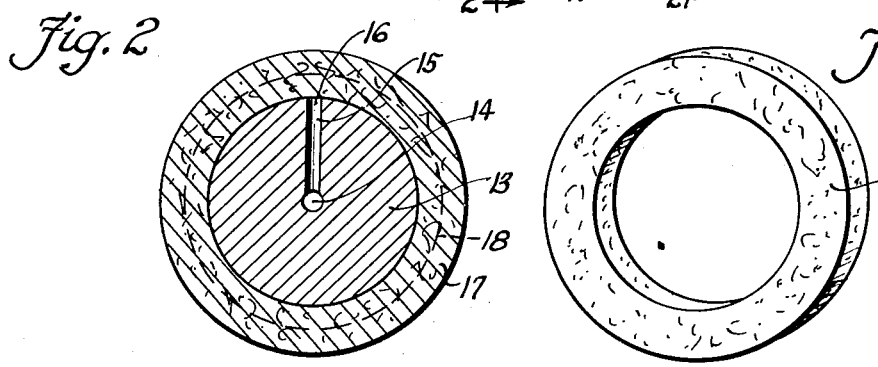
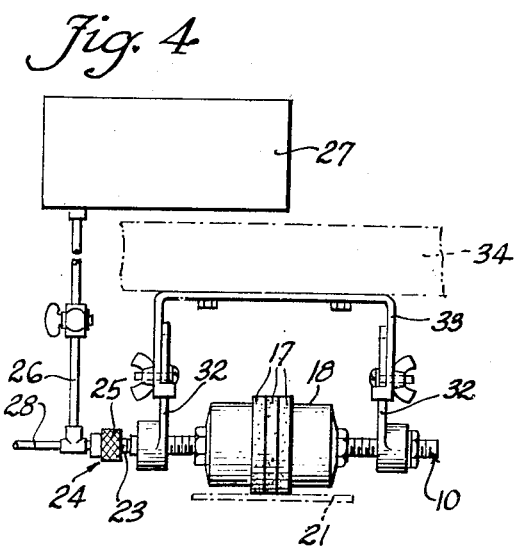
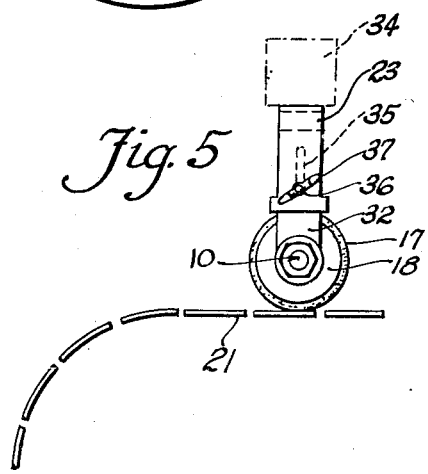
INVENTOR.
Donald L. Sissler
BY
Sheridan, Davis & Cargill
Attorneys Patented Feb. 13, 1951

2,541,301

UNITED STATES PATENT OFFICE 2,541,301

ROLLER LUBRICATOR FOR THE SURFACE OF CONVEYER BELTS

Donald L. Sissler, Oshkosh, Wis., assignor to Keenline Equipment Corporation, Oshkosh, Wis., a corporation of Wisconsin Application July 22, 1948, Serial No. 40,141

2 Claims. (Cl. 91—49)

This invention relates to improvements in lubricators.

One object of the invention is to provide an improved rotatable lubricator that is driven by the member to which it applies the lubricant. Specifically the improved lubricator is adapted for applying a variable quantity of lubricant to the surface of an article conveyor of the endless type. For example, in conveyors that carry articles or production pieces in factories that are shifted laterally of the conveyor at predetermined stations, it frequently is desirable to lubricate the surface of the conveyors for reducing friction during the shifting movements of the articles therefrom. In conveyors used for conveying bottles of carbonated beverages to a mixing or agitating machine, the lubrication of the surface of the conveyors is desirable where the bottles are shifted laterally from the conveyor into the mixing machine. In some instances of use, such as that last referred to, the lubricant employed generally is not an oil lubricant but as will be apparent from the following description, the lubricant employed may be of any appropriate character so long as it is sufficiently fluid to move by capillary action through a lubricant applicator of wick-like character.

Another object of the invention is to provide a driven lubricator provided with adjusting means for varying the rate at which the lubricant may be applied to a contacting surface.

An additional object of the invention is to provide a rotatable lubricator that is adapted to be connected to a lubricant fountain or reservoir and to be driven by contact with a movable conveyor or other machine element to which the lubricant is to be applied.

Other objects of the invention relate to various features of construction and arrangement of parts which will be apparent from the consideration of the following specification and accompanying drawings, wherein:

Figure 1 is a broken elevational view of a rotatable lubricator which is illustrative of the present invention;

Fig. 2 is a sectional view taken on line 2—2 of Fig. 1;

Fig. 3 is a perspective view of a washer-shaped felt or of other wick-like material that constitutes an element of the lubricant applicator;

Fig. 4 is a view, somewhat diagrammatic, illustrating the lubricator in an operative position and shown connected to a reservoir of lubricant which may supply lubricant also to one or more additional lubricators of similar character; and Fig. 5 is a broken end elevational view of the lubricator and the mounting means therefor illustrated in Fig. 4.

In the drawings, the lubricator is shown as comprising a shaft indicated generally by the numeral 10, the shaft having threaded end portions 11 and 12 of relatively reduced diameter as compared with a central or intermediate portion 13 which, as shown in Fig. 1, is a substantially greater diameter than the end portions of the shaft. The end portion 11 of the shaft is shown as having an axial passage 14 which extends into the intermediate portion 13 from which extend a plurality, three as shown in the drawing, of radial lubricant ducts 15 which extend to the surface of the cylindrical portion 13 to provide lubricant outlets 16.

Mounted on the intermediate enlarged portion 13 of the shaft is shown three ring-shaped lubricant applicator sections 17, one of which is shown in perspective in Fig. 3. The sections 17 together constitute an annular applicator which spans the area of the surface of the intermediate section 13 of the shaft containing the ports 16. The ports are regularly arranged or spaced, as indicated, preferably whereby one of the ring-like sections 17 can be positioned over each of the ports, as shown in Fig. 1. The internal diameter of each ring section 17 is such preferably that the ring is slidable with a snug fit upon the enlarged intermediate portion 13 of the shaft. When the rings 17 are compressed one against the other, as shown in Fig. 1, they form in substance a continuous lubricant applicator element.

The applicator element is formed in sections, as described, to eliminate the necessity for obtaining excessively thick material out of which to form the rings. While three of the sections 17 are shown, more may, of course, be employed in assembling the parts of an applicator element to provide the width required in any particular installation of the lubricator.

Means are provided for retaining the applicator section 17 in closely contacting relation one to the other upon section 13 of the shaft. The means shown comprise a pair of cup members 18 having major internal diameters such as enable the cups to slide over the end portions of the intermediate section 13 of the shaft and each provided an opening 19 of a diameter more than sufficient to receive the threaded ends of the respective end sections 11 and 12 of the shaft. Nuts 20 are shown upon the threaded sections 11 and 12 for forcing the cup members one toward the other and thus for compressing the lubricant applicator therebetween. Inasmuch as the driving force that effects rotation of the lubricator is applied to the applicator, the individual rings 17 of the applicator, as stated above, are designed to fit snugly upon the central portion 13 of the shaft. However, ordinarily, the engagement of the rings 17 with the surface of the section 13 of the shaft cannot be depended upon for rotative purposes and hence, the cup members 18 are designed to assert sufficient compression end-wise of the applicator to effectually lock the same to the lubricator for driving purposes. The cup members 18 may be adjusted to provide greater compression or densification of the applicator than is required for effecting a driving relationship between the applicator and the shaft for the purpose of varying the rate at which the lubricant can pass by capillary action from the ports 16 to the outer surface of the applicator. Hence, by adjusting the cups 18 for varying the compressive action thereof on the applicator, the rate of delivery of lubricant by the applicator to the endless conveyor 21 may be effected. It will be apparent that the applicator is not limited in use to the application of lubricant to the surface of an endless conveyor but may be used for applying lubricant to other movable machine elements.

The outer end of the passage 14 is shown enlarged and internally threaded at 22 for receiving a threaded rotatable portion 23 of a coupling member indicated generally by the numeral 24. This coupling is of known construction and comprises a rotatable member 23 that rotates with the shaft 10 while the remaining portion such as the knurled adjusting member 25 remains stationary. The coupling provides a connection between the passage 14 and a supply duct 26 through which fluid lubricant flows to the lubricator from a reservoir or tank 27. In Fig. 4, the tube 26 is shown as being provided with a branch 28 which may supply lubricant to another lubricator, not shown, as will be apparent.

Any suitable means may be provided for mounting the lubricator in driven contact with a conveyor 21 or other machine element. For example, the terminal ends of the sections 11 and 12 of the shaft may be unthreaded and of reduced diameter for supporting appropriate journalling means. In the present illustrative embodiment of the invention, however, the shaft ends 11 and 12 are shown as being provided with threaded collars 29 which carry bushings 30 received within hub-like portions 31 of supporting brackets 32. In Fig. 4, the brackets 32 are shown as being adjustably connected to a yoke-shaped support 33 which is connected to any suitable supporting member 34. The brackets 32, as shown in Fig. 5, are provided with vertical slots 35 extending through which and through an opening in the depending arms of the yoke 33 are screws 36, each provided with a wing nut 37 for clamping the respective brackets to the arms. By this adjusting means, the pressure of the lubricant applicator upon the conveyor 21 may be varied as may be desired. By increasing the pressure of the applicator upon the conveyor as the latter operates, a greater quantity of lubricant is expressed from the applicator.

For the purpose of rendering more uniform the compression of ring member 17 as the cup members 18 are adjusted one toward the other, washers 38 are interposed between adjacent members 17. These washers preferably have an exterior diameter substantially the same as the exterior diameter of the adjacent portions of the cup members 18 which, as is shown clearly in the drawings, is of less diameter than the exterior diameter of the rings 17. By the use of the washers, the compressive force exerted by the cup members when adjusted inwardly is applied more uniformly to the applicator sections 17 whereby lubricant is delivered with greater uniformity to the surface of the driving member 21. The washers 38 preferably are somewhat flexible and hence, may be cut from plastic sheets, if desired although metal washers may be used.

While I have shown and described the present preferred form of the lubricator, it will be apparent that various changes in details may be resorted to without departure from the spirit of the invention as defined by the accompanying claims.

I claim:

1. A driven rotary lubricator comprising a central shaft provided with an intermediate portion of greater diameter than the end portions, the shaft being provided with a lubricant passage extending axially through one end portion into the intermediate portion and having branch delivery ducts extending radially to the surface of the intermediate portion, a plurality of annular rings of wick material disposed on said intermediate portion, each in registration with the outer end of one of said delivery ducts for receiving fluid lubricant therefrom and applying the same to the surface of a driving member contacting the outer peripheries of said rings, means for supplying fluid lubricant from a source thereof to said axial passage, means rotatably engaging the end portions of the shaft for supporting the same, and adjusting means disposed over the end portions of the shaft and having annular portions extending over the adjacent end sections of said intermediate portion of the shaft into contact with the terminal edges of the wick members and being axially adjustable for variably compressing said wick members for controlling the rate of application of lubricant by the outer peripheries of said wick members to the driving surface.

2. A rotatable driven lubricator comprising a rotatable shaft, means journalling the shaft adjacent the ends thereof, the shaft having an intermediate portion of greater diameter than the end portions, the shaft being provided with an axial passage for fluid lubricant extending through one end portion into the intermediate portion and radial delivery ducts extending from said passage to and terminating in outlet ports regularly spaced apart longitudinally in the outer surface of said intermediate portion, an applicator comprising a plurality of annular members of wick material of an internal diameter corresponding to the diameter of said intermediate portion of the shaft and of a thickness approximately that of the distance between said ports and disposed on said enlarged portion of the shaft, one each in registration with one of said outlet ports, relatively thin washers disposed on said enlarged portion of the shaft between adjacent annular wick members of less external diameter than said wick members, cup shaped compression members axially adjustable on the enlarged portion of the shaft comprising annular flanges adapted for contact with the adjacent wick members for exerting end-wise compression on the wick members, said compression members being of smaller diameter than said wick members for cooperation with said washers in effecting uniform end-wise compression of the wick members at the inner portions thereof while enabling the portions of the wick members extending radially beyond said washers and compression member to contact to provide a substantially continuous lubricant applying outer periphery, and means for securing said compression members in axially adjusted position relative to the interposed wicks and washers.

DONALD L. SISSLER.

REFERENCES CITED

The following references are of record in the file of this patent:

UNITED STATES PATENTS

| Number | Name | Date |
|---|---|---|
| 1,183,672 | Ritchey et al. | May 16, 1916 |
| 1,281,003 | Henderson | Oct. 8, 1918 |
| 1,711,245 | Ohmer | Apr. 30, 1929 |
| 1,757,539 | Minor | May 6, 1930 |
| 1,817,683 | Geiger | Aug. 4, 1931 |
| 2,428,965 | Frisco et al. | Oct. 14, 1947 |